United States Patent [19]
Blinow

[11] 3,771,427
[45] Nov. 13, 1973

[54] REFLEX CAMERA WITH MIRROR LATCH

[75] Inventor: Igor Blinow, Millis, Mass.

[73] Assignee: Polaroid Corporation, Cambridge, Mass.

[22] Filed: Feb. 2, 1972

[21] Appl. No.: 222,964

[52] U.S. Cl. ............................................... 95/42
[51] Int. Cl. .......................................... G03b 19/12
[58] Field of Search ......................... 95/42, DIG. 2

[56] References Cited
UNITED STATES PATENTS
3,685,416  8/1972  Coughlan ............................. 95/42
3,641,889  2/1972  Eloranta ......................... 95/DIG. 2
3,672,281  6/1972  Land ...................................... 95/42

Primary Examiner—Samuel S. Matthews
Assistant Examiner—Michael D. Harris
Attorney—Charles Mikulka et al.

[57] ABSTRACT

A latching arrangement for use within a reflex photographic apparatus having a reflecting member which is movable to convert an optical path between viewing and exposure configurations. The latching arrangement is movable into latching association with the reflecting member for securing the same at its viewing position, and selectively movable out of its latching association for permitting the movement of the reflecting member.

19 Claims, 9 Drawing Figures

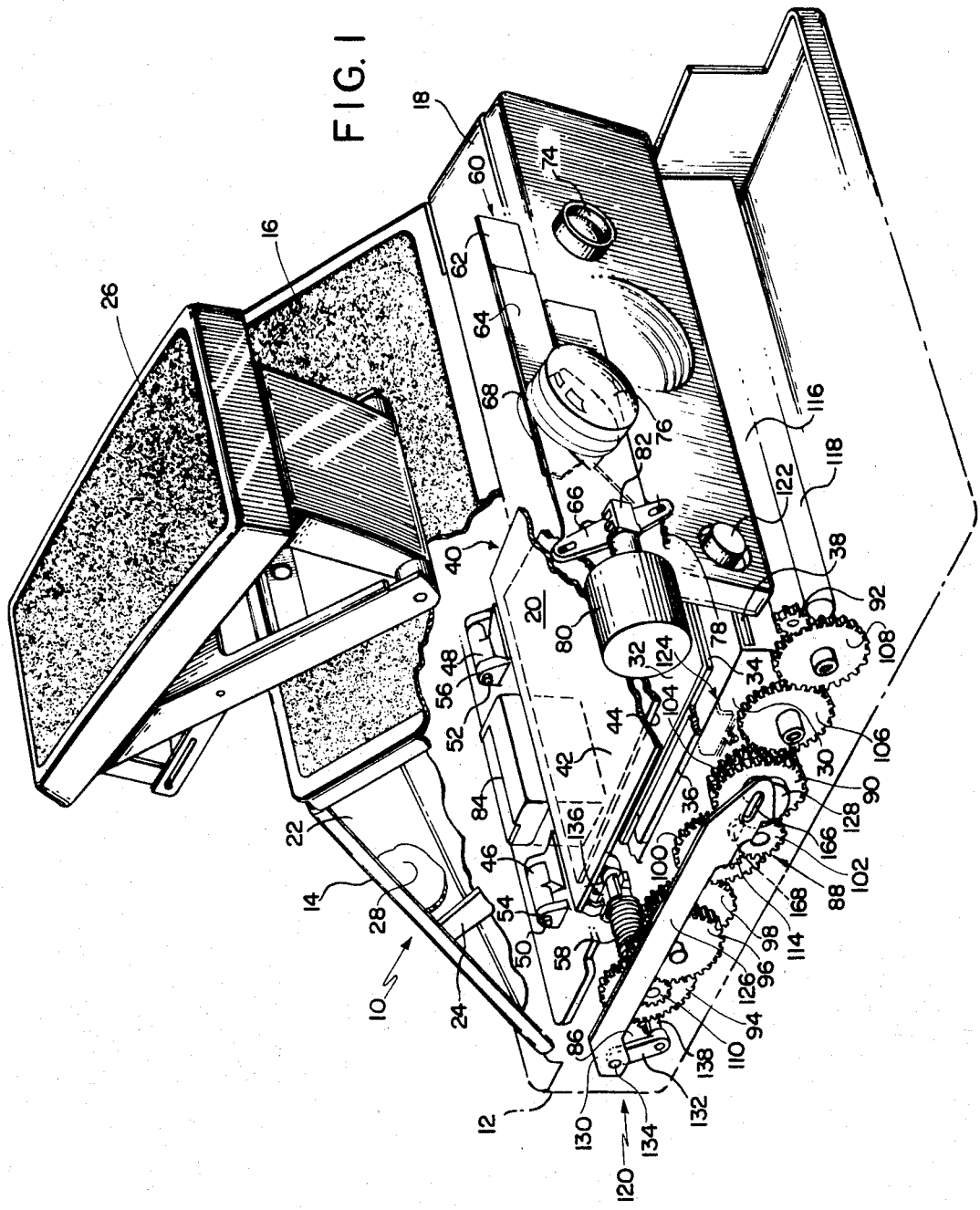

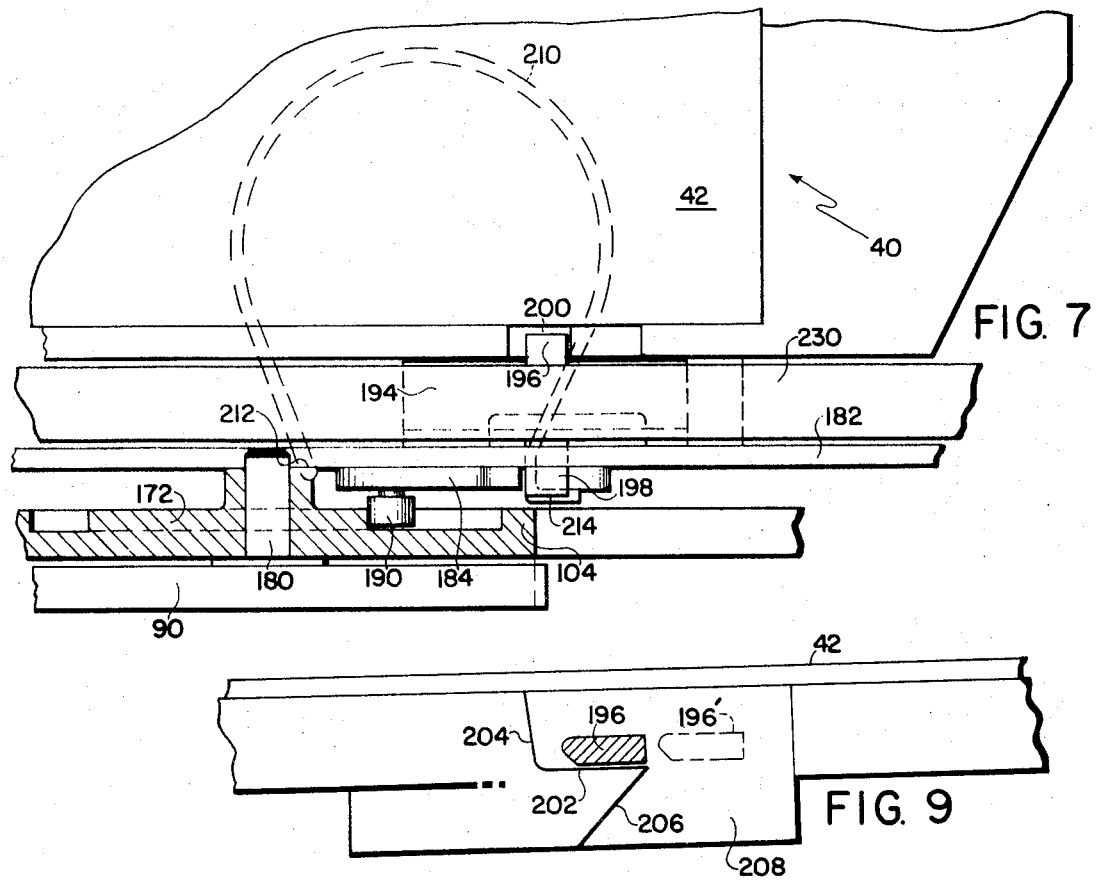
FIG. 7
FIG. 9
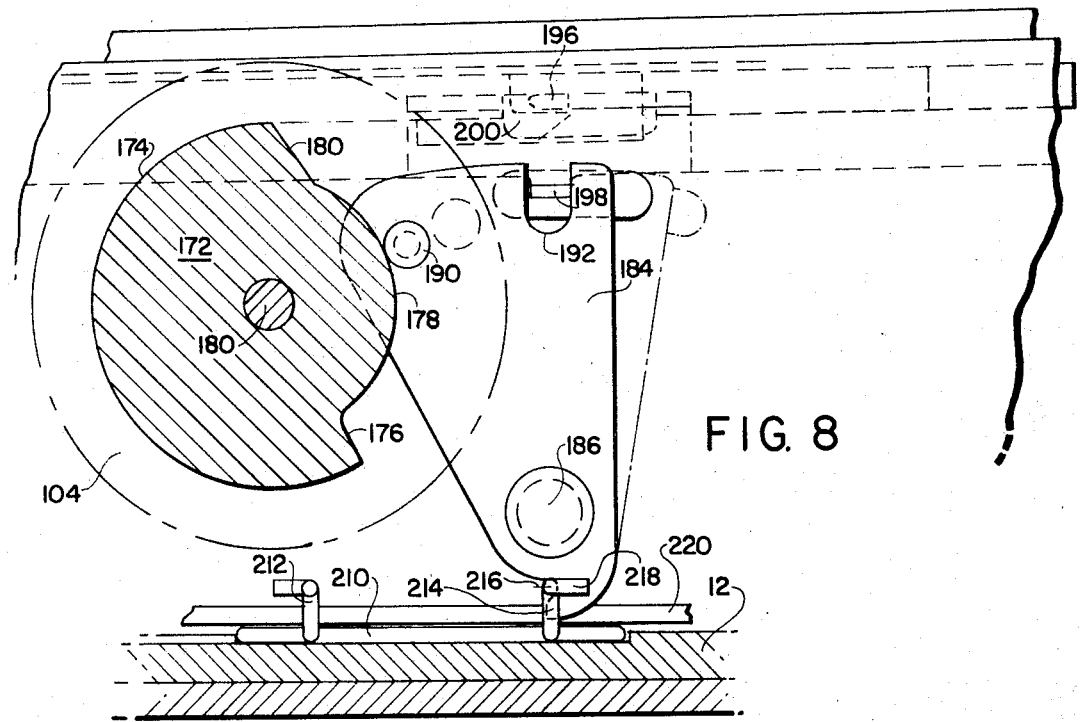
FIG. 8

REFLEX CAMERA WITH MIRROR LATCH

BACKGROUND OF THE INVENTION

Reflex cameras have been developed employing a reflecting member movable between a viewing position and an exposure position. Movement of the reflecting member converts the camera's optical path between viewing and exposure configurations. Such a device is described in a copending application for U.S. Pat. entitled, "Reflex Camera" by Edwin H. Land, Igor Blinow and Vaito K. Eloranta, Ser. No. 134,733, filed Apr. 16, 1971, and assigned in common herewith.

In such cameras the reflecting member is spring driven from a viewing position to an exposure position, both of which are within the camera's optical path. Subsequent to an adequate exposure interval, the reflecting member is returned to its viewing position through the operation of an electric motor and suitable linkages. Since the latter function of the reflecting member necessarily involves the formation of a light seal, there is a concern over manufacturing tolerances. These tolerances associated with properly seating and retaining the reflecting member at its viewing position, are difficult to obtain without recourse to sophisticated mechanical and electronic components.

Problems with manufacturing each camera to within specific tolerances are minimized by providing the motor assembly with some incremental amount of overtravel when the reflecting member is driven into its viewing position. Additionally provided is an overtravel spring which, in addition to other operations, serves to retain the reflecting member in its seated position. Such an overtravel system is described in a copending application for U.S. Pat. entitled "Photographic Apparatus With Dynamically Controlled Reflex Action", by Edward H. Coughlan, Ser. No. 103,219, filed Dec. 31, 1970 and assigned in common herewith. The employment of the overtravel spring and motor overtravel insures proper positioning and seating of the reflecting member at its viewing position where it protects the unexposed photosensitive material. However, the problem of properly protecting the photosensitive material reoccurs if the camera is abused or roughly handled. Should the camera be sharply jostled or bounced, the overtravel spring may not be of sufficient strength to retain the reflecting member in its film protecting position. As a result, ambient light may reach the uncovered film unit and cause either partial or total exposure of the film unit. Accordingly, some method of assuring proper film protection during this period would be most desirable. Such a method should not interfere with normal camera operation, and ideally, should only be operational during periods of unusual stress. The present invention is directed to this problem.

SUMMARY OF THE INVENTION

The present invention is addressed to a latching arrangement for use within a photographic apparatus employing a reflecting member movable to convert an optical path between viewing and exposure configurations. The latching arrangement both establishes latching association with the reflecting member for securing the same at a seated viewing position and is movable out of latching association at the commencement of a photographic cycle for permitting the release of the reflecting member.

Providing a safety feature, the latching arrangement assures that the reflecting member is retained in its seated viewing position should the camera be jostled or bounced. The latching arrangement thus serves to assure that film units within the camera are not inadvertently exposed. The latching association is discontinued during an initial phase of a photographic cycle to permit release of the reflecting member for spring driven movement toward its exposure position.

A motorized control mechanism forming part of the camera's control system operates to release the reflecting member for the noted spring driven movement. Following a photographic exposure, the motorized control mechanism returns and cocks the reflecting member at its seated viewing position. Latching association is only then re-established as the photographic cycle ends.

A lost-motion linkage is operatively associated between the reflecting member and motor drive for permitting an incremental amount of motor operation following the return of the reflecting member to its viewing position. An overtravel spring, formed as part of this lost-motion linkage assembly, operates as an energy storing element during the continued operation of the motor. This stored energy within the over-travel spring is employed to retain the reflecting member in its viewing position. Should the overtravel spring be of insufficient strength to retain the reflecting member in its viewing position during camera abuse, the instant latching arrangement remains operative to do so.

One feature and object of the present invention is to provide a reflex photographic apparatus having a reflecting member which is movable between an exposure position providing an optical path for exposing photosensitive material, and a viewing position for viewing the image of a scene to be photographed and isolating the photosensitive material from ambient light; a drive spring for biasing the reflecting member from its viewing to its exposure position; a control linkage assembly for regulating the movement of the reflecting member, the control assembly being actuable to release the reflecting member for spring driven movement toward its exposure position, and subsequently actuable to drive the reflecting member from its exposure position to its viewing position, the control assembly additionally including a lost-motion linkage operatively associated with the reflecting member for permitting a continued increment of overtravel of the control assembly during its subsequent actuation; and a latching arrangement which is movable into and out of latching association with the reflecting member for assuring the retention of the same at its viewing position.

Another feature and object of the present invention is to provide a latching arrangement for insuring a proper seating of a reflecting member at a viewing position, the latching arrangement being functionally operative both at the initiation of an exposure cycle and during an overtravel performance of the control assembly.

A further feature and object of the present invention is to provide a reflex photographic apparatus having a safety latch which does not interfere with normal camera operation but does provide a latching operation when the normal operation of the camera is interfered with.

Other objects of the invention will in part be obvious and will in part appear hereinafter.

The invention accordingly comprises the apparatus possessing features, techniques and properties which are exemplified in the description to follow hereinafter.

For a fuller understanding of the nature and objects of the invention, reference should be made to the following detailed description taken in connection with the accompanying drawings.

BRIEF DESCRIPTION OF THE DRAWINGS

FIG. 1 is a pictorial representation of a single-lens reflex camera according to the present invention showing its erected shape with portions broken away to reveal internal structure;

FIG. 7 is a fragmentary top plan view of the latching arrangement of the present invention;

FIG. 8 is a partial side elevational view of the latching arrangement of the present invention; and FIG. 9 is a side elevation of portions of the apparatus as shown in FIG. 8.

DETAILED DESCRIPTION OF THE INVENTION

Figure 3:
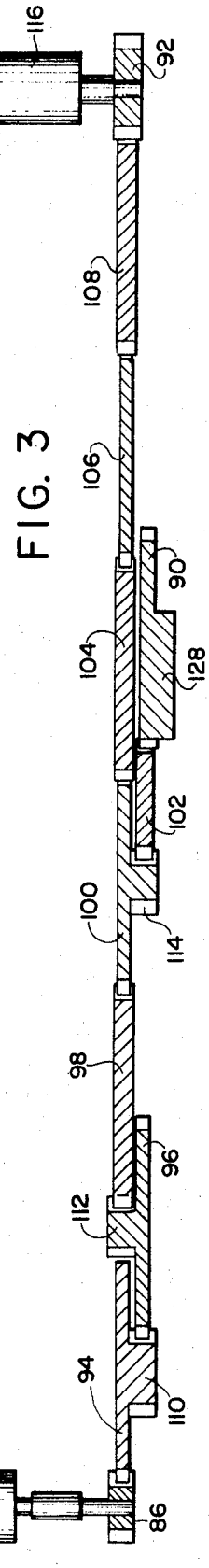
FIG. 3 is a top plan diagrammatic view of the gear train contained within the camera of FIG. 1.

An important embodiment of the present invention is concerned with its incorporation within a fully automatic single-lens reflex camera which may be folded for purposes of being carried in the pocket of a garment. The camera is designed having an optical path which is converted between viewing and exposure mode configurations.

Referring to FIG. 1, such an automatic reflex camera is illustrated generally at 10. Camera 10 is structured having a rectangularly shaped base 12 which pivotally supports a combination of components erectable therefrom into the orientation shown in preparation for camera operation. These components generally include a rear wall 14 having one end hinged to base 12 and an opposite end hinged to a forward wall 16. Forward wall 16 is pivotally connected to the upper rear edge of an exposure control housing 18. Housing 18 is coupled with base 12 by a pivotal connection made along its rearwardly facing edge. Base 12, rear wall 14, forward wall 16 and the exposure control housing combine in the erected state illustrated to form an exposure chamber 20. An opaque bellows, a fragment of which is shown at 22, provides a lighttight configuration for exposure chamber 20. Erecting linkages as at 24 hold the above-outlined components in properly erected positions.

Pivotally mounted upon forward wall 16 is a viewfinder 26. Viewfinder 26 is constructed having collapsible elements (not shown) which allow it to be folded down upon forward wall 16 when not in use. A reflective mirror 28 is fixed to the inward side of rear wall 14. Mirror 28 is so oriented that its reflective surface faces inwardly into exposure chamber 20 and is employed for viewing purposes exclusively.

Positioned at the bottom of exposure chamber 20, and supported by base 12, is a disposable cassette 30. Cassette 30 initially contains a plurality of stacked film units, the uppermost one of which is positioned at at 32 in coincidence with the exposure plane of camera 10. A film frame opening 34, formed within the upper portion of cassette 30, outlines the photographic format of the film unit 32. Cassette structure 30 is properly positioned within base 12 by frame members as at 36 which communicate with the ridge of the film opening of cassette 30. An opening 38 is provided within a peripheral side of cassette 30 for removal of the uppermost film unit 32 for processing following its exposure.

With the orientation as shown in FIG. 1, the components of camera 10 provide for its operation in a viewing configuration. In particular, a flat reflecting member, shown generally at 40, is retained in a spring loaded or cocked orientation over the film frame opening 38 blocking the passage of light therethrough. Reflecting member 40 is configured having a viewing surface 42 on one side and a reflecting surface 44 on its opposite side. While reflecting member 40 is formed having both surfaces 42 and 44 in its present form, it should be noted that this represents a preferred embodiment and need not be the case with respect to other configurations of the present invention. Viewing surface 42 faces into exposure chamber 20 when reflecting member 40 is in a viewing mode configuration. Likewise, reflecting surface 44 faces into exposure chamber 20 when reflecting member 40 is in an exposure mode orientation adjacent rear wall 14. Member 40 is pivotally coupled to the rear of base 12 through hinge extensions 46 and 48 which are, in turn, journaled for rotation about shafts 50 and 52, respectively. Shafts 50 and 52 are supported from dual extensions 54 and 56, respectively, of the frame of base 12. Reflecting member 40 is biased for upward rotation about hinge extensions 46 and 48 into its exposure position adjacent rear wall 14 by a torsion drive spring 58. During a photographic cycle, reflecting member 40 is spring driven from its viewing position to its exposure position adjacent rear wall 14. After a predetermined exposure interval, reflecting member 40 is driven back to its viewing position by a motor 84 located at the rearward portion of base 12.

When in a viewing mode, the components of camera 10 establish an optical path extending from objective lens system 76 to mirror 28 and then to the viewing surface 42 formed on the upward facing portion of reflecting member 40. Surface 42 is configured having a texture and optical design which aids the focusing of the image of a scene to be photographed. This image may be viewed by the camera operator through an optical assembly (not shown) contained within viewfinder 26. Viewfinder 26 and its related internal components are described in detail in a copending application for U.S. Pat. by James G. Baker, filed Dec. 15, 1970, entitled "Reflex Camera and Viewing Device", Ser. No. 98,356, and assigned in common herewith.

Exposure control housing 18, hinged at the forward portion of base 12, contains a dual bladed shutter shown generally at 60. Shutter 60 is structured having two mutually coacting blades 62 and 64 which are reciprocally moved by virtue of their coupling with a reciprocating beam 66. Blades 62 and 64 are configured having selectively tapered aperture openings which cooperably define a progressively varying aperture 68 as beam 66 is rotated. During normal viewing operation, shutter 60 is retained at its maximum aperture width by forces exerted by a spring 78 connected between beam 66 and exposure control housing 18. A solenoid 80 and associated plungers 82 are connected to beam 66. Energization of solenoid 80 draws plunger 82 inwardly, thereby causing beam 66 to rotate. This rotation of beam 66 moves shutter blades 62 and 64 to selectively close shutter 60. Additionally incorporated within exposure control housing 18 is an objective lens system 76 and a photocell, an entrance window of which is located at 74.

A photographic cycle is commenced by depression of a start button 122 mounted upon exposure control housing 18. A depression of start button 122 closes electronic switches (not shown) which are operative to energize solenoid 80 from a battery power source (not shown) contained within film cassette 30. Energization of solenoid 80 causes plunger 82 to be drawn inwardly, whereby shutter blades 62 and 64 are moved to close shutter 60. Following this shutter closure, motor 84 is briefly energized, thereby releasing reflecting member 40 for its spring driven movement towards its exposure position. Simultaneously, motor 84 causes the unlatching of a latch assembly shown generally at 124. Latch assembly 124 is in latching association with reflecting member 40 when the latter is in its viewing position.

After reflecting member 40 reaches its exposure position, a photographic cycle continues with the de-energization of solenoid 80. This de-energization causes shutter blades 62 and 64 to open, thereby initiating an exposure interval. The exposure configuration of the optical path of camera 10 now extends from an objective lens system 76 and aperture 68 to reflecting surface 44 facing inwardly as its position adjacent rear wall 14. The image from surface 44 is reflected into film opening 34 to expose uppermost film unit 32. An exposure interval is terminated when solenoid 80 is again energized to cause shutter blades 62 and 64 to close. In the preferred embodiment, motor 84 again is energized to drive reflecting member 40 back to its viewing position and to actuate mechanisms (not shown) which extract film unit 32 from cassette 30 and start imbibition processing. It should be noted in this regard that the advancement of film unit 32 may be carried out by some action other than the operation of motor 84, e.g. a manual advancement. Subsequent to the proper seating of reflecting member 40 at its viewing position, motor 84 causes latch assembly 124 to be moved into latching association with reflecting member 40. The latching association ensures the retention of member 40 at its viewing position so as to prevent inadvertent light leakage into the film units. After reflecting member 40 has been latched, motor 84 is shut off. Simultaneously, solenoid 80 is de-energized to open shutter blades 62 and 64, thereby returning camera 10 to its viewing mode orientation and terminating a photographic cycle.

Motor 84 is formed as a part of a control linkage assembly shown generally at 120. Control linkage assembly 120 is selectively actuable to both release reflecting member 40 for spring driven movement to its exposure position adjacent rear wall 14 and to recock reflecting member 40 into its viewing position. Providing power for a variety of operational functions within camera 10, the output of motor 84 is coupled to an input gear 86 of a multi-component gear train illustrated generally at 88. Described in detail in a copending application for U.S. Pat. by Edwin H. Land, Igor Blinow and Vaito K. Eloranta, entitled "Reflex Camera", Ser. No. 134,733, filed Apr. 16, 1971, and assigned in common herewith, gear train 88 is formed of a series of eight idler gears 94–108 and three reduction gears 110–114 (see FIG. 3). Gear train 88 provides a selective speed reduction output at a timing gear 90 and a processing drive output at a drive gear 92. In the latter regard, gear 92 is coupled to a pair of processing rollers 116 and 118, positioned at the forward edge of base 12.

Operational control over reflecting member 40 is imparted from a kinematic linkage formed as part of control linkage assembly 120. The kinematic linkage basically contains two elements, a ram member 126 and a cam 128. Cam 128 is fixed for co-rotation with timing gear 90 about its hub (not shown). Both timing gear 90 and cam 128 are rotated one full revolution during a photographic cycle. When camera 10 is in a viewing mode configuration, cam 128 and ram 126 serve to retain reflecting member 40 in its cocked position.

Returning to FIG. 1, the final components of the drive system for camera 10 are shown. Ram 126 is supported at its rearwardmost end by pin 134 and, at its forward end, by a pin (not shown) which slidably engages a slot 166 formed therein. Formed on the inward side of ram 126 is a cam follower 168 engageable with cam 128. The engagement of cam follower 168 with cam 128 serves to retain ram 126 in its rearward position against the biasing of drive spring 58 for purposes of holding member 40 in its viewing position.

Figure 6:
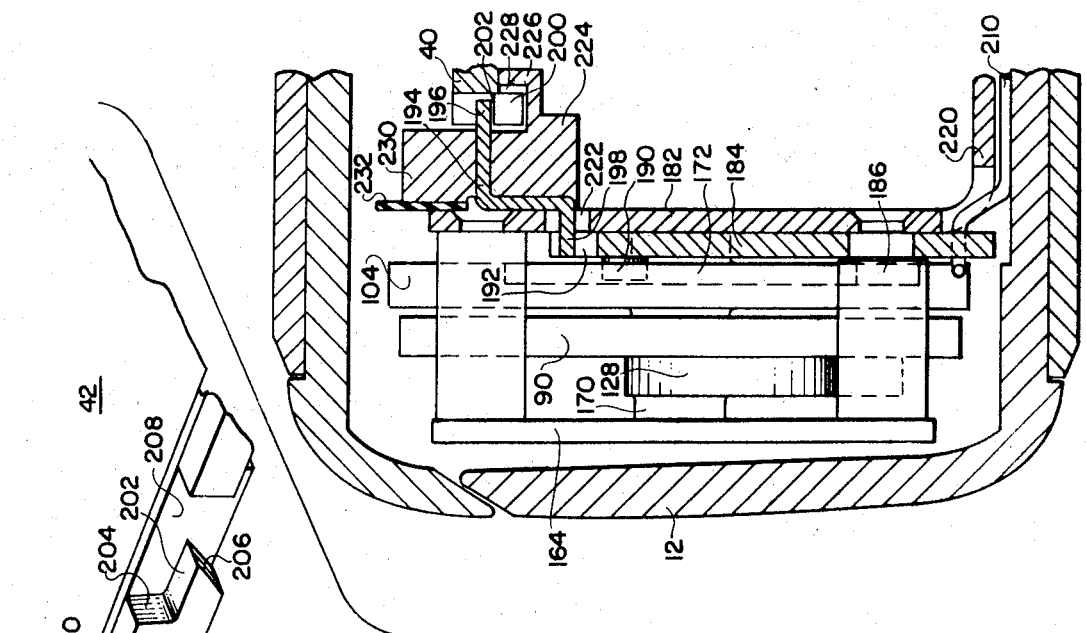
FIG. 6 is a fragmentary transverse section of a portion of the camera and latching arrangement of the present invention.
Figure 5:
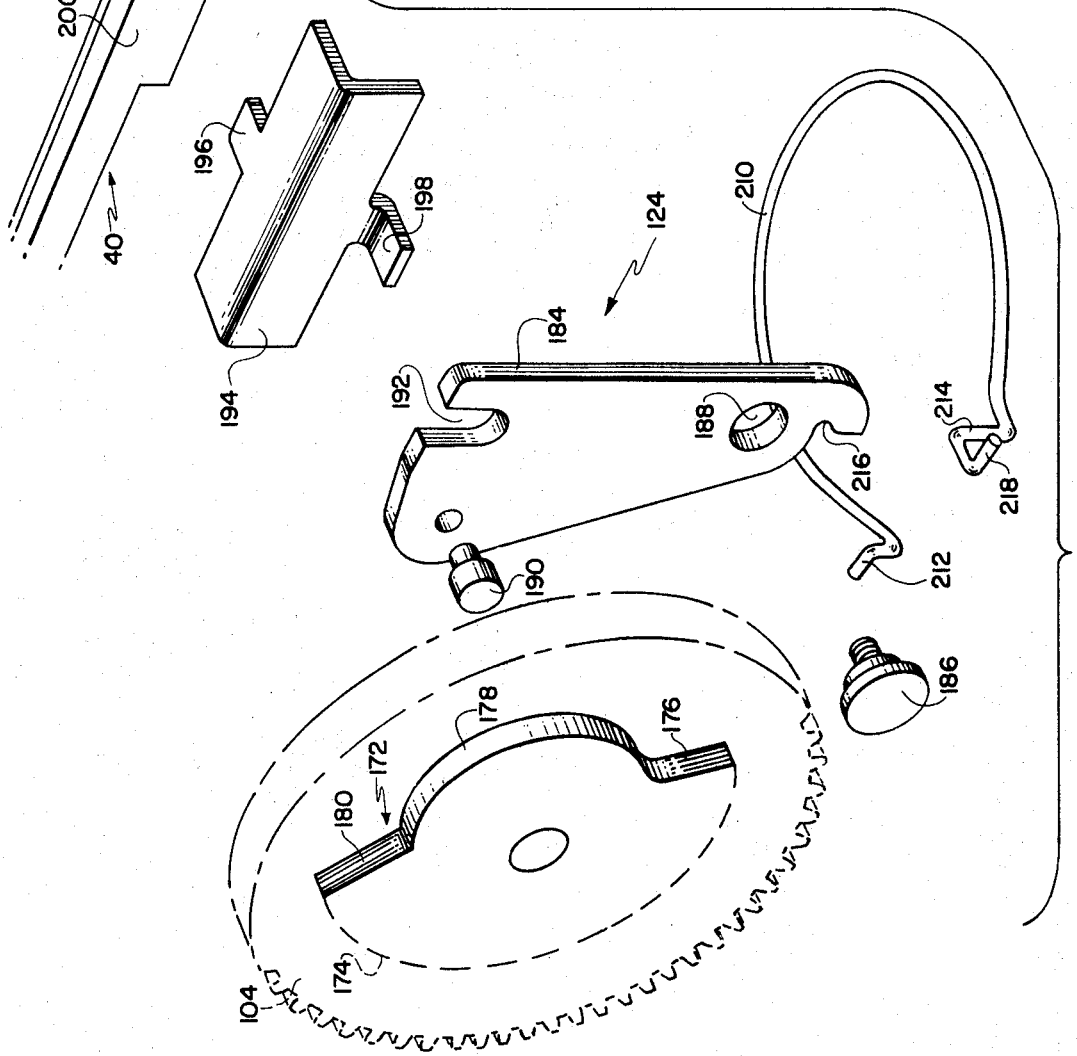
FIG. 5 is an exploded perspective view of a portion of the latching arrangement of the present invention.

Cam 128 is fixed for co-rotation with timing gear 90 about a hub 170 (see FIG. 6). Hub 170 is rotationally mounted between an outer plate 164 and an inner frame 182. At the commencement of a photographic cycle, the initial brief energization of motor 84 causes a slight rotation of timing gear 90 and cam 128. The rotation of cam 128 causes cam follower 168 to "fall off" cam 128, thereby permitting ram 126 to travel forwardly out of its cocked position under spring bias derived from drive spring 58. In addition to causing an initial rotation of timing gear 90 and cam 128, motor 84 also provides an initial rotation of idler gear 104 mounted concentrically with timing gear 90. Rotation of idler gear 104 will be seen to cause the activation of latch assembly 124.

Figure 2:
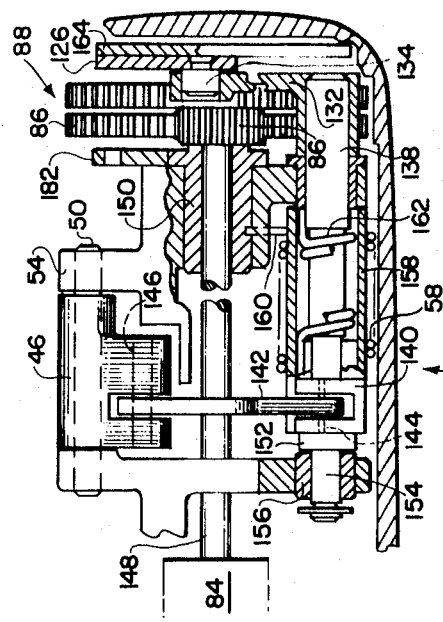
FIG. 2 is a rear fragmentary view of the motor and drive assembly of the camera of FIG. 1 with portions broken away to more clearly reveal internal structure.

Looking to FIG. 2, the rearward end 130 of ram 126 is connected to a bell crank 132 through a pin 134. Bell crank 132 serves as a secondary linkage connecting ram 126 with a four bar linkage, shown generally at 136. Assembly 136, in turn, is coupled in driving relationship with reflecting member 40. Secondary linkages which connect ram 126 with four bar linkage 136 are present as bell crank 132 and a shaft 138. Shaft 138 is operative to establish rotational connection between bell crank 132 and a second bell crank 140. The connection of bell crank 140 to shaft 138 forms the first component of four bar linkage 136. Bell crank 140 is in turn coupled to a draw-down link 142 through a pin 144. Draw-down link 142 is connected to hinge extension 46 through a pin 146. As the final component of four bar linkage assembly 136, shaft 50 pivotally couples hinge extension 46 of reflecting member 40 to the camera frame 12.

Bell crank 140 is formed having a hub portion 152 which is rotatably mounted upon a portion 154 of cylindrical shaft 138. Portion 154 is in turn rotatably supported within a bushing 156 formed within an inner portion of frame 12. Positioned on the opposite side of bell crank 140 is a right hollow cylinder 158 about which drive spring 58 is wound. Cylinder 158 and shaft 138 are joined for mutual rotation through any suitable means, i.e., a pin.

An output shaft 148, fixed to input gear 86, serves to couple the output of motor 84 to gear 86. Shaft 148 is rotatably supported at one end by a bushing 150 fixed to the inner portion of frame 12. The other end of shaft 148 is coupled to motor 84.

Drive spring 58, providing the bias for moving reflecting member 40 from its viewing position to its exposure position, is configured having one end 160 fixed or grounded to the inner portion of frame 12. The opposite end of spring 58 (not shown) is configured to engage a portion of a hollow cylindrical shaft 158. Drive spring 58 is prewound in such a manner as to bias cylinder 158 in a clockwise direction as viewed in FIG. 1. This clockwise rotation of cylinder 158 urges bell crank 140 and the associated four bar linkage 136 to rotate upwardly into their exposure mode positions.

With the arrangmement thus described, when motor 84 is initially energized, rotational force will be transmitted through gear train 88, thereby causing the slight rotation of timing gear 90 and cam 128. When cam 128 is sufficiently rotated, ram 126 is released and is free to move forwardly under the bias imparted thereto by drive spring 58 through the secondary linkages. Forward movement of ram 126 permits the clockwise rotation of bell crank 132 and shaft 138. Due to the connection between shaft 138 and cylinder 158, the latter is moved correspondingly under the bias imparted from drive spring 58. Bell crank 140, coupled with cylinder 158, is rotated in the same clockwise manner, thereby causing draw-down link 142 to move upwardly. The upward driving force exerted from bell crank 140 through link 142 results in a counterclockwise rotation of hinge extensions 46 and 48 about shafts 50 and 52, respectively. As a result, reflecting member 40 is rotatably driven in a counterclockwise direction into its exposure mode orientation.

Positioned coaxially with drive spring 58, and contained within hollow cylinder 158, is a low-rate torsion overtravel spring 162. Overtravel spring 162 is formed having one end connected to an inner portion of cylinder 158 with its opposite end statically connected with a portion of bell crank 140. Overtravel spring 162 and its operation are described in detail in the above-mentioned application Ser. No. 103,219. While referring to a spring similar to overtravel spring 162, the above-identified application uses the term "override spring". For purposes of clarity, it is to be understood that these terms are synonymous.

During the return movement of reflecting member 40, overtravel spring 162 provides a lost-motion connection between member 40 and motor 84. The lost-motion connection is operative to absorb an incremental amount of motor rotation subsequent to the return of reflecting member 40 and four bar linkage 136 to their viewing mode positions. Overtravel spring 162 exerts a continuing bias upon four bar linkage 136 which is connected to reflecting member 40. The bias exerted by spring 162 through four bar linkage 136 to reflecting member 40 serves to retain member 40 at its viewing position.

The return of reflecting member 40 to its cocked viewing position is carried out during the second energization of motor 84. Rotation of input gear 86 is translated through gear train 88 to timing gear 90. Timing gear 90 and cam 128 are rotated in a counterclockwise direction (see FIG. 1) approximately 350°, thereby completing one full revolution during the second energization of motor 84. The rotation of cam 128 during this second energization causes the return of ram 126 toward its initial cocked position. The rearward movement of ram 126 results in a counterclockwise rotation of bell crank 132 and shaft 138. Cylinder 158 and bell crank 140 are thereby caused to rotate correspondingly. As cylinder 158 and bell crank 140 are rotated, drive spring 58 and overtravel spring 162 are rewound and draw-down link 142 is moved downwardly. This latter movement causes the clockwise rotation of hinge extensions 46 and 48. As a result, reflecting member 40 is moved from its exposure position toward its viewing position. When member 40 is returned to its viewing position and drive spring 58 has been fully rewound, ram 126 completes its rearward movement and closes an electronic switch (not shown). Note in this regard that motor 84 is permitted to operate an incremental amount of time after reflecting member 40 is seated at its viewing position. It is overtravel spring 162 which absorbs this extra amount of motor rotation, thereby providing the bias necessary to retain member 40 at its viewing position.

Referring to FIGS. 5-9, latching assembly 124 is illustrated in enhanced detail. As shown in the exploded perspective view in FIG. 5, latching assembly 124 is operably associated with idler gear 104, the inward side of which is formed to define an internally disposed cam surface 172. Cam surface 172 is configured having a high dwell portion 174, a rapid drop off portion 176, a low dwell portion 178 and a rapid rise portion 180. Rotatably mounted upon inner frame 182 is an actuator member 184. Rotative mounting of actuator 184 is provided by a pin 186 extending through a hole 188 and fixed to frame 182. Positioned on the upper portion of actuator 184 is a cam follower pin 190. Cam follower pin 190 is secured to the outward side of actuator 184 and is positioned so as to selectively contact portions 174–180 of cam surface 172. A slot 192 is formed within the top portion of actuator member 184.

Positioned on the inward side of actuator 184 is a generally "Z" shaped latch member 194. Latch member 194 is formed having an inwardly extending lug 196 and an outwardly extending lug 198. Lug 198 is configured to fit within slot 192 of actuator member 184. Inwardly extending lug 196 is configured so as to move into and out of latching association with a docking assembly 200 formed within a peripheral side of reflecting member 40. As seen in FIG. 9, docking assembly 200 is configured having a land 202, a step portion 204, and an inclined cam surface 206.

The cam follower pin 190 of actuator member 184 is biased into contact with cam surface 172 by a generally U-shaped spring 210. One end of spring 210, as at 212, is secured to a portion of inner frame member 182 while the other end, as at 214, is configured to be engaged by a grooved portion 216 of actuator member 184. Spring end 214 is configured having an extension 218 which assures that spring end 214 is securely engaged by notched portion 216 of actuator member 184. This engagement can best be seen in FIGS. 6 and 8.

As seen in FIG. 6, actuator spring 210 is retained in a horizontal position by a bottom portion 220 of inner frame 182. When properly positioned with end 212 secured to inner frame 182 and end 214 secured to notched portion 216 of actuator 184, spring 210 exerts a force which rotates actuator 184 in a counterclockwise direction. As a result, cam follower pin 190 is biased into contact with cam surface 172 and assumes a positive drive condition.

Outward lug 198 of latch member 194 extends through a slot 222 formed within inner frame 182 and is captured within slot 192 formed within actuator member 184. Latch member 194 is supported for lateral movement by a portion 224 of inner frame 182. Inner frame portion 224 is fixedly attached to inner frame 182 and is structured having an extension thereon shown generally at 226. Extension 226 is configured to form a slot or groove 228 peripherally extending about the inner frame portion 224. Groove 228 forms a landing for docking assembly 200 of reflecting member 40 and, additionally, forms a light seal for protecting the photosensitive material located within cassette 30. Secured to inner frame portion 224 is a bellows retaining member 230. Bellows retainer 230 is operative to clamp a bellows segment 232 to inner frame portion 224. A slot (not shown) is formed between the junction of bellows retainer 230 and inner frame portion 224 to permit the passage of latch member 194 therethrough.

The operation of latching assembly 124 is dependent upon the clockwise rotation of idler gear 104 during various portions of camera 10 operation. Specifically, when camera 10 is in a viewing mode orientation, idler gear 104 is in a position best shown in FIG. 8. In that Figure, cam follower pin 190 is shown to engage low dwell portion 178 of cam surface 172. Actuator 184 is in a position representing the extreme of its counterclockwise rotation. Cam follower pin 190 is biased into, and remains in engagement with, low dwell portion 178 due to its positive drive condition. This status is best shown in FIG. 8. As seen in FIGS. 7 and 9, latch member 194 is in a position where inwardly extending lug 196 is in latching association with docking assembly 200. When in this status, inwardly extending lug 196 prevents the accidental rotation of reflecting member 40 out of its viewing position.

During the initial brief energization of motor 84 at the commencement of a photographic cycle, input gear 86 as well as the component gears of gear train 88 are caused to rotate. Referring additionally to FIG. 3, a schematic of the various gear components of gear train 88 is shown. As may be evidenced from the noted Figure, counterclockwise rotation of gear 86 causes a clockwise rotation of idler gear 104 and a counterclockwise rotation of timing gear 90. Referring to FIG. 8, the amount of clockwise rotation of idler gear 104 and cam surface 172 is sufficient to move cam follower pin 190 out of engagement with low dwell portion 178, across rapid use portion 180 and into engagement with high dwell portion 174. As a result of the movement of cam follower pin 190, actuator member 184 is rotated clockwise about pin 186. This rotational movement of actuator member 184 causes a translational movement of latch member 194, whereby inwardly extending lug 196 is moved out of latching association with land 202 to a position as at 196' in FIG. 9. Lug 196 is now in an uncovering relationship with land 202. Thus unlatched, reflecting member 40 is free to be released from its cocked status by the disengagement of ram 126 and cam 128. The full release of reflecting member 40 for its spring driven movement occurs just subsequent to its unlatching.

As noted above, idler gear 104 and timing gear 90 are rotated simultaneously during the brief energization of motor 84. The total rotation of timing gear 90 during this brief energization is comparatively small (approximately 10°).

| Gears | 100 | 114 | 102 |
|---|---|---|---|
| Meshing | 104 | 102 | 90 |
| Tooth Ratio | 50/50 | 12/26 | 26/48 |

As can be seen from the included table, idler gear 104 rotates at a rate which is four times that of timing gear 90. Therefore, while timing gear 90 rotates one full revolution during a photographic cycle, idler gear 104 rotates four revolutions. During the brief energization of motor 84, in which timing gear 90 rotates approximately 10° to release ram 126 for movement, idler gear 104 will rotate clockwise approximately 40° from its initial position as shown in FIG. 8.

When idler gear 104 and timing gear 90 have been rotated 40° and 10°, respectively, motor 84 is shut off. Actuator member 184 and latch member 194 remain in their unlatched positions until such time as a photographic exposure is obtained and motor 84 is again energized to return reflecting member 40 downward from its exposure position to its viewing position.

Figure 4:
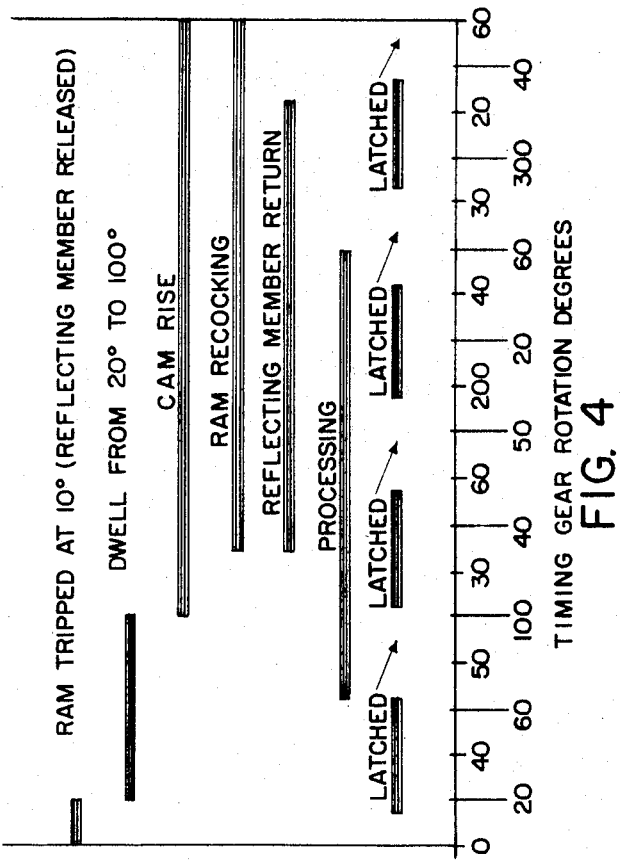
FIG. 4 is a chart showing the relative actuation times of important components of the mechanism of the invention during a photographic cycle.

During such time as motor 84 is energized to drive reflecting member 40 downward, gear train 88 and the associated component gears are again rotated to perform various photographic operations. For example, timing gear 90 is rotated counterclockwise approximately 350°, thereby completing its full revolution to return gear 90 and cam 128 to their initial cocked positions. Due to the gear ratios previously discussed, idler gear 104 is rotated clockwise approximately 1,400° (3.9 revolutions) during the 350° of timing gear 90 rotation. After an initial 160° of idler gear rotation, cam follower pin 190 falls off high dwell portion 174 and across rapid drop off portion 176. Due to the positive drive condition between cam surface 172 and pin 190, the latter is moved in a counterclockwise direction. Counterclockwise movement of pin 190 results in a similar rotation of actuator member 184, thereby returning latch member 194 to its "latched" position. Due to the total amount of idler gear rotation, this "latching" and "unlatching" operation is carried out several times. Latch assembly 124 is "latched" four times and "unlatched" three times during the 1,400° rotation of idler gear 104. The phasing of these operations can best be seen by referring to FIG. 4. Note that only the first "unlatching" and final "latching" phases are operationally important. During all other phases of "latching" and "unlatching", reflecting member 40 is not in a viewing mode position and docking assembly 200 cannot be placed in "latched" or "unlatched" association with latching member 194.

As reflecting member 40 reaches its viewing position, a final "latching" phase occurs. This final latching, however, is dependent upon the lost-motion operation of overtravel spring 162. When reflecting member 40 is properly seated in its viewing position, motor 84 continues to run. Overtravel spring 162 absorbs this incremental amount of rotation and retains reflecting member 40 at its seated position. As a result of this extra operation of motor 84, idler gear 104 and cam surface 172 are rotated a sufficient amount to cause pin 190 to fall off high dwell portion 174, across rapid drop off portion 176 and into engagement with low dwell portion 178. Accordingly, actuator member 184 is rotated counterclockwise to its position as shown in FIGS. 7 and 8. Lug 196 is again moved into latching association with land 202 and reflecting member 40 is latched. When this operation has been completed, motor 84 is shut off and a photographic cycle is completed.

Latch assembly 124 is additionally configured to provide a safety latching operation. Should latching member 194 "stick" in its "latched" position while reflecting member 40 is in its exposure position, the return motion of reflecting member 40 will automatically unlatch member 194, permitting the proper seating of reflecting member 40. During this safety latching operation, cam surface 206 of docking assembly 200 cams lug 196 into its "unlatched" position against the bias of spring 210 (see FIG. 9). Accordingly, the positive drive condition between pin 190 and cam surface 172 is temporarily severed and pin 190 and actuator member 184 are forcibly rotated to their "unlatched" positions. Once reflecting member 40 is properly seated, latching member 194, actuator member 184 and pin 190 are returned to their "latched" position under the counterclockwise bias imparted thereto by spring 210. Once latched, pin 190 and cam surface 172 will again be in a positive driving condition.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Reflex photographic apparatus comprising:

means defining an optical path having one configuration for viewing the image of a scene to be photographed and another configuration for imaging said scene at an exposure plane, said means including a reflecting member movable between an exposure position, in which photosensitive material is exposed, and a viewing position isolating said photosensitive material from ambient light, said movement converting said optical path between exposure and viewing configuration during a photographic cycle;

means for biasing said reflecting member to move from said viewing position toward said exposure position;

control means for regulating said reflecting member movement between said viewing and exposure positions, said control means including drive means actuable during an initial phase of said photographic cycle to release said reflecting member for movement under said bias toward said exposure position, said drive means being actuable during a subsequent phase of said photographic cycle to drive said reflecting member from said exposure position into said viewing position, and lost-motion linkage means operatively associated between said reflecting member and said drive means for absorbing movement of said drive means during continued actuation of said drive means following the movement of said reflecting member into said viewing position; and latching means movable in response to said drive means actuation during said initial and said subsequent phases of said photographic cycle, said latching means being movable into latching association with said reflecting member for securing said reflecting member at said viewing position and movable out of latching association with said reflecting member for permitting the release of said reflecting member.

2. Reflex photographic apparatus comprising:

means defining an optical path having one configuration for viewing the image of a scene to be photographed and another configuration for imaging said scene at an exposure plane, said means including a reflecting member movable between a viewing position covering said exposure plane and an exposure position uncovering said exposure plane for converting said optical path to said exposure configuration;

drive means for moving said reflecting member from said viewing position to said exposure position;

control linkage means connected with said drive means and said reflecting member;

actuator means coupled with said control linkage means, said actuator means being movable in response to movement of said control linkage means; and latch means engageable with said reflecting member, said latch means being coupled to said actuator means and movable in response to said actuator means movement, said latch means being operative to selectively retain said reflecting member at said viewing position, whereby said photographic material is protected from unintentional exposure to light at said exposure plane.

3. Reflex photographic apparatus comprising:

means defining an optical path having one configuration for viewing the image of a scene to be photographed and another configuration for imaging said scene at an exposure plane, said means including a reflecting member movable between a viewing position, in which photographic material is covered, and an exposure position in which said photographic material is uncovered, said reflecting member movement being operative to convert said optical path from a viewing configuration to an exposure configuration during a photographic cycle;

drive spring means coupled to said reflecting member, said drive spring means being operative to move said reflecting member from said viewing position to said exposure position;

control linkage means connected with said drive spring means and said reflecting member;

overtravel means connected to said control linkage means, said overtravel means being operative to effect a rotational overtravel to said reflecting member when said reflecting member is moved from said exposure position to said viewing position, whereby said reflecting member is seated at said viewing position and said photographic material is covered;

actuator means connected to said control linkage means, said actuator means being movable in response to movement of said control linkage means; latch means engageable with said reflecting member, said latch means being coupled to said actuator means and movable in response to said actuator means movement, said latch means and said overtravel means being operative to selectively retain said reflecting member at said viewing position, thereby insuring proper protection of said photographic material when said reflecting member is in said viewing position.

4. The reflex photographic apparatus according to claim 3 in which said control linkage means is operative to regulate the movement of said reflecting member between said viewing position and said exposure position, said control linkage means including drive means selectively actuable to release said reflecting member for movement under the influence of said drive spring means toward said exposure position and being selectively actuable to drive said reflecting member from said exposure position into said viewing position.

5. The reflex photographic apparatus according to claim 4 in which said overtravel means operates as a lost-motion connection between said reflecting member and said drive means for absorbing said rotational overtravel of said reflecting member when said reflecting member is moved from said exposure position into said viewing position during continued actuation of said drive means following the movement of said reflecting member into its said viewing position.

6. The reflex photographic apparatus according to claim 5 in which said latch means is positioned in overlying relationship with a portion of said reflecting member when said reflecting member is in its said viewing position, said latch means being so configured as to remain in its said overlying relationship with said reflecting member without contacting said reflecting member and being further configured to contact said reflecting member and retain said reflecting member in its said viewing position when said overtravel means is insufficient to retain said reflecting member in its said viewing position.

7. The reflex photographic apparatus according to claim 6 in which actuator means is movable between a latching and an unlatching position, the latched position of said actuator means corresponding to the latched position of said latch means and the unlatched position of said actuator means corresponding to the unlatched position of said latch means, said actuator means being movable into and out of said latched and unlatched positions a succession of times during a full photographic cycle in response to said movement of said control linkage means.

8. The reflex photographic apparatus according to claim 7 in which said control linkage means contains a cam gear means, said cam gear means being connected to said actuator means for causing said actuator means to move between said latched position and said unlatched position in response to said movement of said control linkage means.

9. The reflex photographic apparatus according to claim 8 in which said actuator means is in a positive driven relationship with said cam gear means, said positive drive relationship causing said movement of said actuator means from its said latched position to its said unlatched position.

10. The reflex photographic apparatus according to claim 9 in which said actuator means is biased into said positive drive relationship with said cam gear means by a spring means, said spring means causing said actuator means to move toward its said latched position against said positive drive relationship.

11. The reflex photographic apparatus according to claim 10 in which said latch means is formed as a Z shaped member, one end of which is connected to said actuator means and the other end of which is operative to remain in said overlying relationship with said reflecting member when said reflecting member is positioned in its said viewing position.

12. The reflex photographic apparatus according to claim 11 in which said cam gear means includes high dwell means for positively driving said actuator means toward said unlatched position and low dwell means for permitting said actuator means to move into its said latched position under the influence of said spring means.

13. The reflex photographic apparatus according to claim 12 in which said reflecting member is formed having a viewing surface on one of its sides and a reflective surface on its other side.

14. The reflex photographic apparatus according to claim 7 in which a portion of said reflecting member is configured having means for temporarily removing said latch means out of its said latching position if said latch means is stuck in its latching position and said reflecting member has not been returned to its said viewing position.

15. The reflex photographic apparatus according to claim 14 in which said means for temporarily removing said latch means is formed as a ramped camming surface on a lower lateral portion of said reflecting member, said ramped camming surface being operative to cam said latch means out of its said latching position when said latch means is stuck in its said latching position and said reflecting member has not been returned to its said viewing position.

16. The reflex photographic apparatus according to claim 15 in which said reflecting member is formed having landing means positioned in overlying relationship with said latch means when said reflecting member is in its said viewing position and said latch means is in its said latched position, said latch means being contactable by said landing means when said overtravel spring is insufficient to retain said reflecting member in its said viewing position, whereby said reflecting member is retained in its said viewing position.

17. The reflex photographic apparatus according to claim 16 in which a first portion of said landing means is positioned in overlying relationship with said ramped camming surface.

18. The reflex photographic apparatus according to claim 17 in which a second portion of said landing means is configured having an aperture formed therein for permitting said reflecting member to move from its said viewing position to its said exposure position when said latch means is in its unlatching position within said aperture.

19. The reflex photographic apparatus according to claim 18 in which said latch means is movable from a latching position in overlying relationship with said second portion of said landing means to its said unlatching position in which said latch means is within said aperture of said second portion, the movement of said latch means between its said latched position and its said unlatched position being minimized by said aperture formed in said second portion of said landing means.

* * * * *